United States Patent [19]

Roose

[11] 4,049,140

[45] Sept. 20, 1977

[54] BALE CARRYING AND UNROLLING DEVICE

[76] Inventor: Gerald L. Roose, Rte. 3, Pella, Iowa 50219

[21] Appl. No.: 660,662

[22] Filed: Feb. 23, 1976

[51] Int. Cl.² .............................................. B66F 9/18
[52] U.S. Cl. ................................ 214/147 G; 214/653;
242/86.5 R; 294/88
[58] Field of Search .......................... 294/DIG. 2, 88;
214/147 R, 147 G, 650 R, 653; 242/86.5 R

[56] References Cited

U.S. PATENT DOCUMENTS

| | | | |
|---|---|---|---|
| 2,564,357 | 8/1951 | Falkner | 294/88 X |
| 3,880,305 | 4/1975 | Van Polen | 214/147 G |
| 3,908,846 | 9/1975 | Brummitt | 214/147 G |
| 3,946,887 | 3/1976 | Parker | 214/147 G X |
| 3,958,772 | 5/1976 | Hynson | 214/147 G X |

FOREIGN PATENT DOCUMENTS 903,555   2/1954   Germany ............................ 214/653

Primary Examiner—Frank E. Werner
Attorney, Agent, or Firm—Zarley, McKee, Thomte, Voorhees & Sease

[57] ABSTRACT

A bale carrying device comprised of a cross bar frame structure having a pair of spaced apart rearwardly extending arms pivotally mounted on the ends of the cross bar frame structure for pivotal movement about the vertical axis of the cross bar; and having means for laterally adjusting the pivotal axis of the arms for selectively varying the width of the space between the arms in order to accommodate large round bales of varying thicknesses.

7 Claims, 5 Drawing Figures

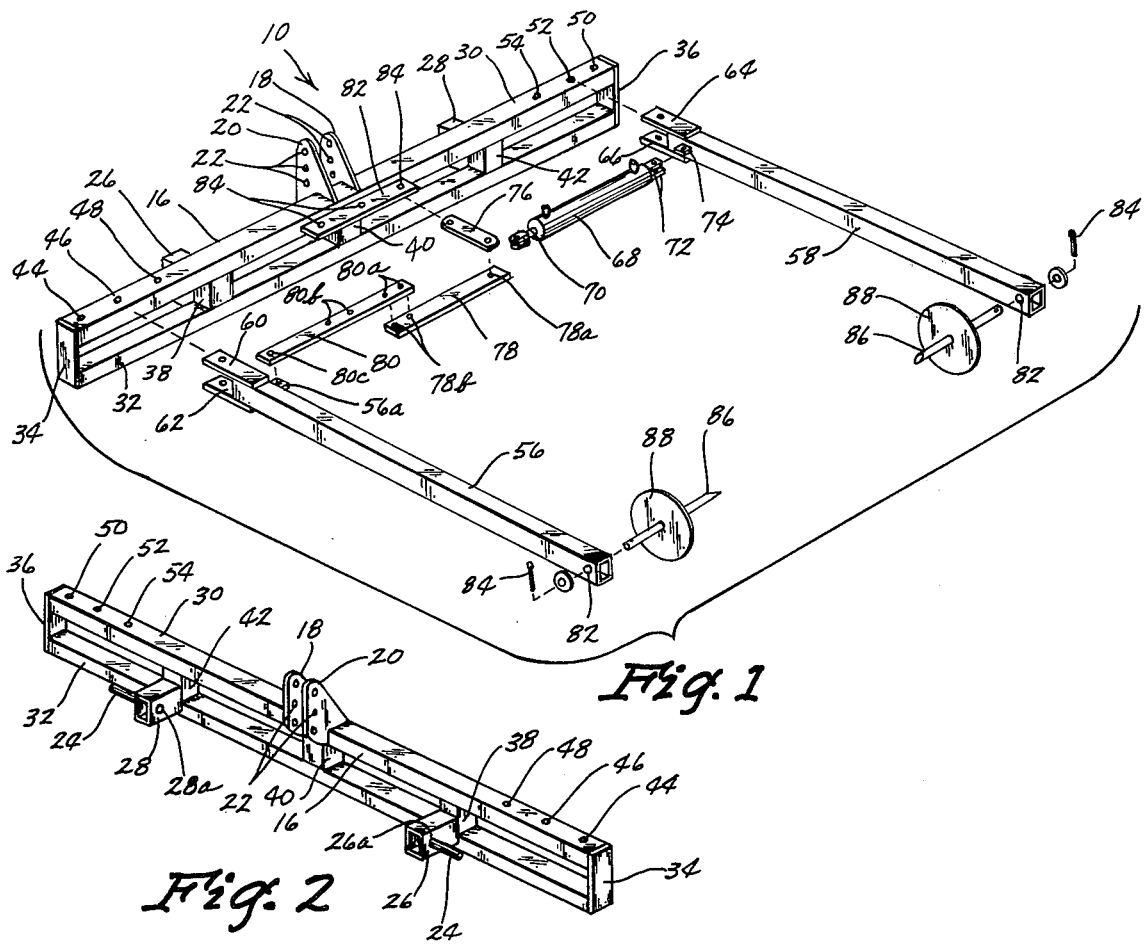
Fig. 1
Fig. 2
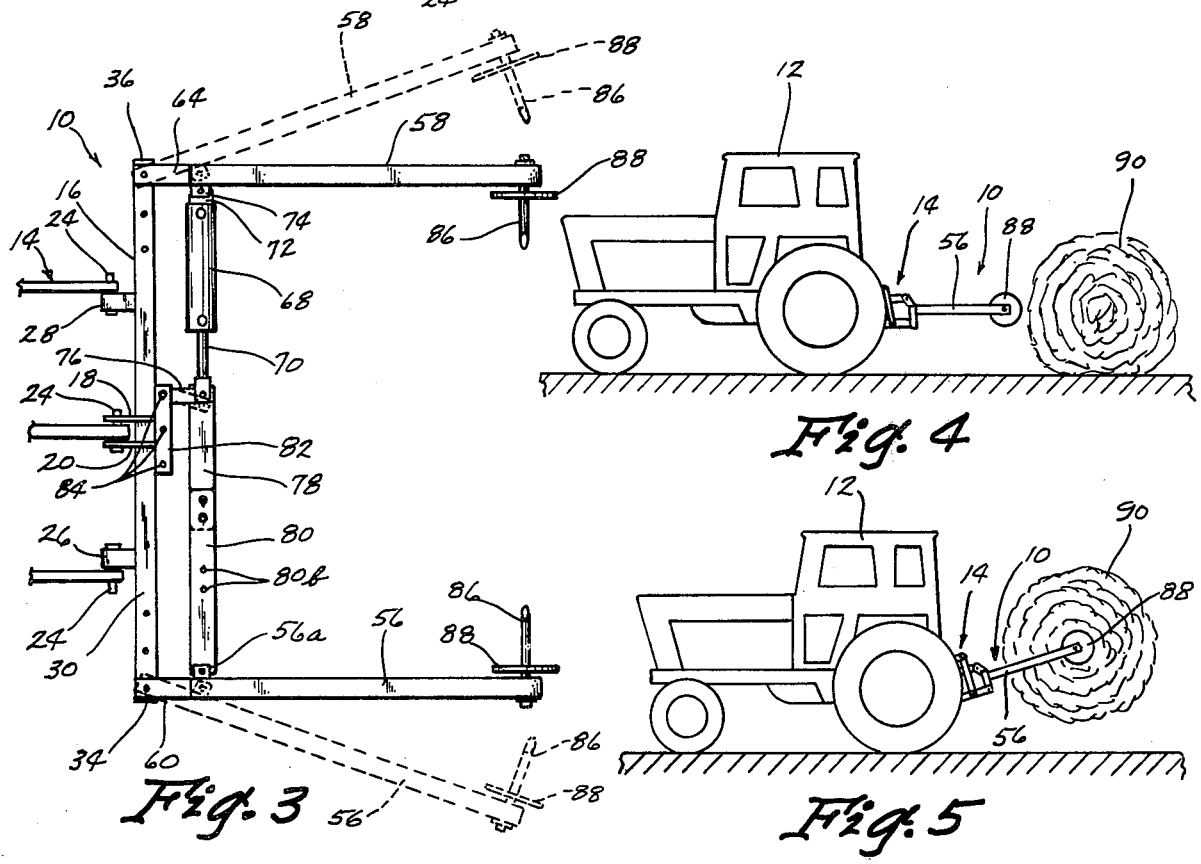
Fig. 3
Fig. 4
Fig. 5

BALE CARRYING AND UNROLLING DEVICE

BACKGROUND OF THE INVENTION

In recent years the handling of hay has seen a trend moving from small rectangular shaped bales to the use of large bales of great size and weight. Such large bales generally are comprised of the hay being in a long strip which is wound in a spiral fashion with the bales being up to six feet in diameter or even perhaps larger and of substantial thickness as well as weight. Such bales have many advantages over smaller bales but also have the disadvantage of being more difficult to handle and move about in a field. Because of the large size and weight of such bales, conventional bale handling equipment used for the small rectangular shaped bales has been inadequate to properly handle and move large bales.

While certain devices have been developed having the capability of moving and unrolling large bales of the type referred to herein, one of the problems for handling such large bales is that the bales often vary greatly in thickness, depending upon the baling machine being used. For example, some bales may have a thickness of four feet, others five feet, and others, six feet. This bale thickness, or width, creates problems in handling the bales in that the bale carrier and unroller must be variably adjustable to handle such bales.

Accordingly, one object of this invention is to provide a bale carrying and unrolling device which has a capability of lateral adjustment so that a single bale carrying and unrolling device may be utilized to accommodate bales of varying widths.

Yet another object of this invention is to provide a bale carrying and unrolling device which is simple in construction, not bulky in appearance, and which is compact and can be easily disassembled in a manner of minutes, making it easy to transport and store.

The method of accomplishing these and other objects of the invention will become apparent from the following detailed description of the invention.

BRIEF DESCRIPTION OF THE DRAWINGS

FIG. 1 is a perspective view showing the relationship of the various components of the bale carrying and unrolling device of this invention.

FIG. 2 is a perspective view of the cross bar of the device of this invention.

FIG. 3 is a plan view of the device of this invention with the dotted lines showing the arm movements from an outward position to an inward position.

FIG. 4 shows the bale carrying device of this invention as it is attached to a prime mover backing towards a bale.

FIG. 5 shows the bale carrying device of this invention with the bale carrier grasping a bale in its upright carrying position.

DETAILED DESCRIPTION OF THE INVENTION

The bale carrying device, referred to generally as 10, can be attached to a prime mover or tractor 12 via a conventional three-point hitch 14. Shown in detail in FIG. 2 is the cross bar 16 of the device. Positioned at about the midway point of cross bar 16 are upward extending spaced apart support plates 18 and 20 which are utilized to secure the cross bar frame to an implement hitch, such as the three-point hitch 14, of the prime mover 12.

Spaced apart upwardly extending plates 18 and 20 have apertures 22 aligned vertically therein in order to provide for a vertical adjustment of the attachment to the three-point hitch 14. Pins 24 are used to attach the hitch to the frame of the cross bar via plates 18 and 20, as depicted in FIG. 3.

In like manner, forwardly extending hitch supports 26 and 28 are also attached via pins 24 through apertures 26a and 28a to the three-point hitch 14.

Cross bar 16 as best depicted in FIG. 2 itself is comprised of a pair of spaced apart horizontal frame members 30 and 32, with 30 being the top frame member and 32 being the bottom frame member. End supports 34 and 36 extend between top frame member 30 and bottom frame member 32. To provide further strength for cross bar 16 spaced apart mid-support braces 38, 40 and 42 extend between top frame member 30 and bottom frame member 32. Top frame member 30 has near one end spaced apart apertures 44, 46 and 48 and at its opposite end spaced-apart apertures 50, 52, and 54. As will be hereinafter explained, apertures 44, 46, 48, 50, 52 and 54 provide for the lateral adjusting of the pivotal axis of the arms, hereinafter described.

Spaced apart arms 56 and 58 extend rearwardly, generally transverse to the longitudinal axis of cross bar 16. The forward or inner ends of arms 56 and 58 have mounting plates 60, 62 and 64, 66, respectively, as depicted in FIG. 1. Thus, mounting plates 60 and 62, for example, of arm 56 are spaced apart of a sufficient width such that plate 60 will lie in overlying relationship over the top of frame member 32 and plate 62 will lie in overlying relationship over the bottom surface of frame member 30. A pin, not specifically depicted in the drawing, will extend through the aperture in plate 60, unnumbered, through one of the apertures 44, 46 or 48 of top frame member 30 of cross bar 16 and therefore provide for pivotal movement of arm 56 about the vertical axis of cross bar 16. Arm 58 is mounted in like fashion as heretofore described with arm 56.

Hydraulic cylinder 68 having ram 70 is mounted to arm 58 via cylinder bracket 72 and a bolt as shown at 74. Ram 70 is operatively secured to arm 56 via an adjustable cylinder movement strap comprised of link members 76, 78, and 80. In particular, link member 76 is pivotally pinned to ram 70 and also pivotally pinned to rearwardly extending plate 82. Plate 82 is attached approximately mid-point to cross bar 16 and has three apertures 84 therein, so that linkage member 76 may be pinned to either of the apertures in plate 82. Of course, as heretofore mentioned, linkage member 76 has the apertures, not specifically numbered, at each end for pivotal attachment to ram 70 and for pivotal attachment to rearwardly extending plate 82 of cross bar 16. Also attached by a pin to ram 70 is first linkage bar 78. Linkage bar 78 is pinned at the end attached to ram 70 via receiving hole 78a and at its opposite end, pin receiving hole 78b, which as depicted can be aligned with apertures 80a in second linkage bar 80. Also positioned about mid-way in second linkage bar 80 are apertures 80b and at the opposite end of second linkage bar 80 is aperture 80c which may be pinned in conventional fashion as shown in FIG. 3 to arm 56, as depicted at 56a.

The outer ends of arms 56 and 58 have pinned thereto via apertures 82 in arms 56 and 58 by means of conventional cotter key 84, and use of a conventional washer 85, inwardly presented tines 86. Tines 86 have positioned thereon gripping plates 88, for gripping the side surfaces of bale 90.

In actual operation, the device of the invention may be used as follows. As depicted in FIG. 4, the hitch 10 is attached to a three-point hitch 14 of a prime mover 12 and the prime mover is moved rearwardly towards bale 90. When the operator is ready to pick up bale 90, hydraulic cylinder 68 is activated to extend ram 70. Extending of ram 70 moves arms 56 and 58 in an outward swinging movement about their pivotal axis, as pin and to cross bar 16, to the outward positions depicted in the dotted lines of FIG. 3. Ram 70 is retracted causing arms 56 and 58 to move to their inwardly presented positions depicted in solid line relationship in FIG. 3. Tines 86 are thrust into bale 90 and gripping plates 88 hold the outer surface of bale 90. The bale can then be moved to an above ground position as depicted in FIG. 5 by raising the bale carrier and it can be moved from one position to another, the bale lowered to the ground, and unwrapped as the prime mover 12 is driven forwardly.

In the event that the bale is of too narrow a width to be grasped by tines 86 when arms 56 and 58 are mounted in their most outwardly positions as shown in FIG. 3, arms 56 and 58 can have their pivotal axis, by the point of attachment to cross bar 16, adjusted laterally inwardly by selectively pinning the inner ends of arms 56 and 58 to the inwardly presented apertures 46 or 48 with respect to arm 58 and apertures 52 and 54 with respect to arm 56. In like manner, linkage member 76, in order to decrease the effective width between arms 56 and 58 is pinned to the more inwardly presented apertures of plate 82 and correspondingly linkage bar 78 is pinned to linkage bar 80 at the more inwardly presented apertures 80b. Thus it can be seen that means is provided for laterally adjusting the pivotal axis of arms 56 and 58 in order that one can selectively vary the width of the space between arms 56 and 58 so that bales of either greater or lesser thickness can be conveniently carried.

Easy storage of the device can be accomplished by simply unpinning arms 56 and 58 from cross bar 16 and unpinning the link 76 and link bar 78 from hydraulic ram 70, whereupon the device may be conveniently stored.

Thus as can be seen, a convenient bale carrying and unrolling device offering versatility of use, ease of storage, and importantly, a means for laterally adjusting the device to accommodate bales of varying widths has been provided. The device accomplishes at least all of the stated objects of the invention as heretofore mentioned.

What is claimed is:
1. A bale carrying and unloading device for use with a three-point hitch or the like, said device comprising:
    a cross-bar frame structure with a plurality of horizontally spaced apart vertical apertures,
    securing means on said frame to secure said frame to an implement hitch of a prime mover,
    a pair of spaced apart rearwardly extending arms pivotally mounted by hinge means on said cross bar frame structure for pivotal movement about a vertical axis,
    said hinge means comprising a pin for pivotally mounting each of said arms to said cross bar, said pin being received within one of said apertures in said cross bar frame and being selectively movable to other of said apertures,
    a hydraulic cylinder having an extendable and retractable ram at one end and mounted at its opposite end to one of said arms, said ram being operatively secured to said other arm for selectively effecting the pivoting of said arms towards and away from one another, and
    a cylinder movement strap of adjustable length to adapt to lateral adjustment of the pivotal axis of said arms having one end secured to said ram and the other end secured to said other arm.
2. The device of claim 1 wherein said rearwardly extending arms have at their outer ends, inwardly extending bale grasping members.
3. The device of claim 2 wherein said bale grasping members are tines.
4. The device of claim 3 wherein each of said tines has an associated bale gripping plate.
5. The device of claim 4 wherein said device disassembles to a compact unit for easy storage.
6. The device of claim 1 wherein said cylinder movement strap of adjustable length comprises first and second link members each having a plurality of apertures along its length, and means within said apertures securing said link members together.
7. The device of claim 6 wherein said cylinder movement strap of adjustable length comprises a third link member pivotally connected at one end to said ram and said first link member and pivotally connected at the other end to said frame structure.

* * * * *